United States Patent Office 3,590,103
Patented June 29, 1971

3,590,103
DIALKYL OR ALKYL ALKYLOXYALKYL-1-SUBSTITUTED VINYL PHOSPHATES
Charles H. Tieman and Glenn E. Pollard, Modesto, Calif., assignors to Shell Oil Company, New York, N.Y.
No Drawing. Filed Apr. 25, 1968, Ser. No. 724,241
Int. Cl. C07c *153/07;* C07f *9/08;* A01n *9/36*
U.S. Cl. 260—941                                      7 Claims

ABSTRACT OF THE DISCLOSURE

Certain novel dialkyl iso-enol phosphates, primarily useful as intermediates for the preparation of pesticidal dialkyl enol phosphates.

BACKGROUND OF THE INVENTION

Field of the invention

This invention relates to a novel class of organophosphates, primarily of interest for the preparation of known, and also, pesticidal organophosphates, with compounds of the novel class themselves having substantial insecticidal and/or anthelmintic properties.

Description of the prior art

Japanese Publication No. 20,568/63 disclosed iso-enol phosphates of the formula

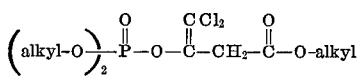

A variety of pesticidal dialkyl enol phosphates are known: U.S. Pats. 2,685,552; 2,865,944; 2,891,887; 2,894,014; 2,894,018; 2,895,982; 2,898,341; 2,982,685; 2,982,686; 3,014,838; 3,014,839; 3,053,729; 3,366,715. These are commonly prepared via the so-called Perkow Synthesis, wherein a trialkyl phosphite is reacted with the appropriate alpha-chlorocarbonyl precursor.

It will be noted that a large proportion of these enol phosphates are characterized by the general formula

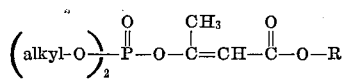

wherein R is one of a variety of organic moieties.

Also, as is shown in the patents, these compounds are generally prepared by reacting a trialkyl phosphite with an R ester of 2-chloroacetoacetic acid.

The ester is ordinarily prepared by chlorination of the R ester of acetoacetic acid.

However, such a process is not suitable where the ester moiety, R, is not inert with respect to the chlorinating agent. Examples include cases where R is acetylenic, or is phenyl containing a reactive substituent, such as R'—S— wherein R' is hydrogen, alkyl, or the like. Also, the corresponding thio esters

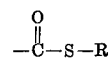

cannot be chlorinated because of the reactivity of the sulfur linkage.

Because of the value, or potential value, of such compounds, it is desirable that there be available a process for making them readily.

It now has been discovered that the corresponding iso-enol phosphates, such as those having the general formula,

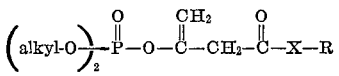

wherein X is oxygen or sulfur are readily altered, by treatment with certain bases, to the corresponding enol phosphates.

The iso-enol phosphates can be prepared by the following synthesis:

(a) Diketene is chlorinated to form 4-chloroacetoacetyl chloride, $ClCH_2$—$C(O)$—$CH_2$—$C(O)Cl$. This reaction is described by Hurd and Abernathy, J. Am. Chem. Soc., 62 1147 (1940). Briefly, the chlorination is readily effected by introducing chlorine into a solution of diketene in carbon tetrachloride or methylene chloride at about 0° C. The chloride is recovered by removal of the solvent at reduced pressure, or is used as is in the solvent.

(b) The acid chloride is reacted with the appropriate alcohol R—OH, or mercaptan R—SH to form the corresponding ester, $ClCH_2C(O)$—$CH_2$—$C(O)X$—R, wherein X=S or S. The reaction of an alcohol with the 4-chloroacetoacetyl chloride, too, is described by Hurd and Abernathy. Briefly, the reaction can be effected by adding the chloride to a solution of the alcohol in a suitable inert solvent, such as methylene chloride, at the reflux temperature to remove HCl as formed. Alternatively, sodium carbonate or bicarbonate can be added to remove the HCl.

(c) The ester is reacted with a trialkyl phosphite to form the iso-enol phosphate.

Since the iso-enol phosphates thus can be prepared by a process which avoids chlorination of the R ester of acetoacetic acid, the iso-enol phosphates provide effective precursors for preparing enol phosphates of chlorine-reactive acetoacetates, they provide an alternate route to the other enol phosphates as well.

DESCRIPTION OF THE INVENTION

This invention is a novel class of compounds having the general formula

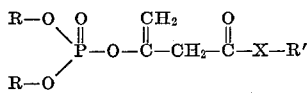

wherein each R is the same, or is different, and is alkyl of from one to four carbon atoms, or is alkyl of from two to eight carbon atoms containing one to two oxy(—O—) oxygen atoms linking carbon, X is oxygen or sulfur and R' is alkyl of one to four carbon atoms, alkenyl of two to four carbon atoms, alkynyl of three to four carbon atoms, aryl or aralkyl (in which the alkyl(ene) moiety contains from one to four carbon atoms), either unsubstituted or substituted on the aromatic ring by from one to three substituents selected from alkyl of one to four carbon atoms, halogen (particularly middle halogen—bromine or chlorine), alkoxy of from one to three carbon atoms, alkylthio, alkylsulfinyl or alkylsulfonyl of from one to three carbon atoms, sulfonamido, N-alkylsulfonamido of from one to four carbon atoms, or N,N-dialkylsulfonamido wherein each alkyl contains from one to four carbon atoms.

In those compounds in which R' represents aralkyl, it is generally preferred that the alkyl(ene) moiety contain only one carbon atom linking the aryl (preferably phenyl) moiety to the carboxyl moiety, any other carbon atom(s) forming a side chain. Of most interest as insecticides are the members of the subclass wherein the alkyl(ene) moiety is —CH(CH$_3$)—.

Typical, illustrative species of this new class of compounds are set forth in the working examples set out hereinafter, as well as the following:

(1) dimethyl 1-(4-(N,N-dimethylsulfonamido)-benzyloxycarbonylmethyl)-vinyl phosphate;
(2) dimethyl 1-(alpha-methyl-4-(N,N-diethylsulfonamido)benzyloxycarbonylmethyl)vinyl phosphate;
(3) methyl methoxyethyl 1-(4-(N,N-dimethylsulfonamido)benzyloxycarbonylmethyl)vinyl phosphate;
(4) methyl methoxyethyl 1-(alpha-methyl-4-(N,N-diethylsulfonamido)benzyloxycarbonylmethyl)vinyl phosphate.

As has already been pointed out, compounds of this new class can be prepared by chlorinating diketene, reacting the resulting 4-chloroacetoacetyl chloride with an alcohol, then reacting the resulting 4-chloroacetoacetate with a trialkyl phosphite. In the working examples set out hereinafter this route will be referred to as Method A.

An alternative route (Method B) is also available, which also avoids chlorination of the acetoacetic acid ester. In this route, the starting material is a 3-(dialkoxyphosphinyloxy)crotonyl chloride. It is reacted with a base and an alcohol, to form the iso-enol phosphate directly. The crotonyl chlorides are the subject of copending application Ser. No. 441,861, filed Mar. 22, 1965, soon to issue as a patent. Conversion of the crotonyl chloride to the iso-enol phosphate ester is accomplished readily by treating the chloride with a strong tertiary amine base and at the same time or immediately thereafter, with the appropriate alcohol. Essentially stoichiometric proportions (1:1:1 mole ratio) of the chloride, base and alcohol are used. Suitable reaction temperatures lie within the range of from about —80° C. to +50° C., ordinary room temperature often being quite satisfactory as well as convenient. Suitable bases include pyridine, methyl picolines, methyl piperidines, and tri(C$_1$–C$_4$ alkyl) amines, triethyl amine being preferred. The reaction preferably is conducted in a suitable inert solvent, methylene chloride or other chloroalkane being preferred.

Preparation of typical compounds of this invention is illustrated in the following examples. In these, "parts" means parts by weight unless otherwise expressly indicated, and parts by weight bear the same relationship to parts by volume as does the kilogram to the liter.

EXAMPLE I

Dimethyl 1-(methoxycarbonylmethyl)vinyl phosphate (A) (Method A)

To 66 parts of methyl 4-chloroacetoacetate was added over a period of 0.3 hour 66 parts of trimethyl phosphite, with cooling to maintain the reaction mixture at 60–70° C. The mixture then was heated for 2.5 hours at 85° C., and then was distilled to give 91.6 parts of (A), boiling at 115–116° C. (0.2 torr), identified by infra-red and nuclear magnetic resonance spectrum analyses and elemental analyses as (A).

Analysis.— Calculated for PO$_6$C$_7$H$_{17}$ (percent by weight): P, 13.9; Cl, 0.0. Found (percent by weight): P, 13.6; Cl, 0.3.

EXAMPLE II

Dimethyl 1-(alpha-methylbenzloxycarbonylmethyl)vinyl phosphate (B) (Method A)

19.2 parts of alpha-methylbenzyl-4-chloroacetoacetate was treated in portions with 12 parts by volume (about 23% excess of 93%) trimethyl phosphite over a period of 20 minutes. The temperature of the mixture rose slowly and was maintained at 70–80° C. until heat evolution ceased. The mixture was heated for 1.5 hours at 80° C., stripped to 70° C. (1.5 torr) to leave 25.2 parts of clear, colorless liquid. This was taken up in ether, washed with dilute hydrochloric acid, then with sodium bicarbonate solution, dried and stripped through a rotary evaporator at 60° C. (0.5 torr) to leave 23.2 parts of (B), as a clear pale yellow liquid. Identification was made by infra-red and nuclear magnetic resonance spectrum analyses, and elemental analysis.

Analysis.—Calculated for PO$_6$C$_{14}$H$_{20}$ (percent by weight): P, 9.9; Cl, 0.0. Found (percent by weight): P, 9.1; Cl, 0.3.

EXAMPLE III

Dimethyl 1-(alpha-3-dimethylbenzyloxycarbonylmethyl)vinyl phosphate (C) (Method B)

28 parts of 3-(dimethoxyphosphinyloxy)crotonyl chloride in 150 parts by volume of carbon tetrachloride were treated, with stirring, by dropwise addition of a mixture of 11 parts of triethylamine and 15 parts of alpha, 3-dimethylbenzyl alcohol over a 30-minute period. The mixture then was stirred for 1.5 hours to permit the moderately warm mixture to return to room temperature. The mixture then was washed with 100 parts by volume each of 3 N hydrochloric acid, water and 5% aqueous sodium bicarbonate, dried, then stripped on a rotary evaporator, at water-aspirator vacuum. It was then stripped in a wiped-film molecular still at 75° C., 0.1 torr. Yield: 26 parts of (C), as a brown oil, identified by infra-red and nuclear magnetic resonance spectrum analyses, and elemental analysis.

Analysis.—Calculated for PO$_6$C$_{15}$H$_{21}$ (percent by weight): P, 9.5; C, 54.9. Found (percent by weight): P, 9.6; C, 55.3.

Nuclear magnetic resonance spectrum analysis indicated the product to contain about a 4:1 ratio of the iso-enol

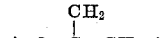

and enol

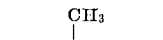

isomers.

EXAMPLE IV

By one or both of Methods A and B, as indicated, the compounds set out in Tables Ia, Ib and Ic were also prepared.

Compounds of this invention have been found to be insecticidal with respect to several species of insects. Table II summarizes the activity of certain species of the novel compounds with respect to two species of insects.

TABLE Ia

Compounds of the subclass having the structure:

$$\begin{array}{c} R_1-O \\ \phantom{R_1-}\diagdown \\ \phantom{R_1-O}P-O-C-CH_2-C-R_3 \\ \phantom{R_1-}\diagup \\ R_2-O \end{array} \quad \begin{array}{c} O \\ \uparrow \end{array} \quad \begin{array}{c} CH_2 \\ \| \end{array} \quad \begin{array}{c} O \\ \| \end{array}$$

| Compound | $R_1$ | $R_2$ | $R_3$ | Calcd. P | Calcd. Cl | Calcd. S | Found P | Found Cl | Found S | Method |
|---|---|---|---|---|---|---|---|---|---|---|
| D | $C_2H_5-$ | $C_2H_5-$ | EtO— | 11.6 | 0.0 | | 11.8 | <0.3 | | A |
| E | $CH_3-$ | $CH_3-$ | $CH_2=CHCH_2O-$ | 12.4 | 0.0 | | 11.4 | 1.6 | | A |
| F | $C_2H_5-$ | $C_2H_5-$ | $CH_2=CHCH_2O-$ | 11.1 | 0.0 | | 11.0 | 0.6 | | A |
| G | $CH_3-$ | $CH_3-$ | $CH\equiv CCH_2O-$ | 12.5 | 0.0 | | 11.6 | 0.4 | | A |
| H | $C_2H_5-$ | $C_2H_5-$ | $CH\equiv CCH_2O-$ | 11.2 | 0.0 | | 11.0 | 0.2 | | A |
| I | $CH_3-$ | $CH_3-$ | $C_6H_5O-$ | 10.8 | 0.0 | | 10.6 | 0.1 | | A |
| J | $C_2H_5-$ | $C_2H_5-$ | $C_6H_5O-$ | 9.9 | 0.0 | | 9.8 | 0.2 | | A |
| K | $CH_3-$ | $CH_3-$ | $p-CH_3SC_6H_4O-$ | 9.3 | | 0.0 | 9.4 | | 0.2 | A |
| L | $CH_3-$ | $CH_3-$ | $C_6H_5S-$ | 10.3 | | 10.6 | 9.8 | | 11.6 | A |
| M | $C_2H_5-$ | $C_2H_5-$ | $C_6H_5S-$ | 9.4 | | 9.7 | 9.3 | | 10.4 | A |
| N | $CH_3-$ | $CH_3-$ | $C_6H_5CH_2S-$ | 9.8 | | 10.1 | 9.4 | | 10.7 | A |
| O | $C_2H_5-$ | $C_2H_5-$ | $C_6H_5CH_2S-$ | 9.0 | | 9.3 | 9.0 | | 9.7 | A |
| P | $CH_3-$ | $CH_3-$ | $2,4-(CH_3O)_2C_6H_3$<br>$\phantom{xx}\|$<br>$-O-CH_2$ | 8.6 | | | 8.7 | | | B |
| Q | $CH_3-$ | $CH_3-$ | $4-CH_3S-C_6H_4CH_2O-$ | Infra-red spectrum | | | | | | A |

TABLE Ib

Compounds of the subclass having the structure:

$$\begin{array}{c} R_1-O \\ \phantom{R_1-}\diagdown \\ \phantom{R_1-O}P-O-C-CH_2-C-O-CH-\!\!\!\!\!\bigcirc\!\!\!\!\!-Cl \\ \phantom{R_1-}\diagup \\ R_2-O \end{array} \quad \begin{array}{c} O\quad CH_2\quad O\quad C_3H_7 \\ \uparrow\ \ \|\ \ \ \ \ \|\ \ \ \ \ | \end{array}$$

| Compound | $R_1$ | $R_2$ | Calcd. P | Calcd. Cl | Found P | Found Cl | Method |
|---|---|---|---|---|---|---|---|
| R | $CH_3-$ | $CH_3-$ | 8.2 | 9.4 | 7.3 | 9.3 | A |
| S | $CH_3-$ | $CH_3-$ | 7.7 | 8.8 | 8.0 | 9.9 | A |
| T | $CH_3-$ | $C_3H_7-$ | 7.7 | 8.8 | 7.5 | 11.0 | A |
| U | $CH_3-$ | $CH_3OC_2H_4-$ | 7.4 | 8.5 | 7.3 | 8.8 | A |

EXAMPLE V

Solutions of typical compounds of the invention were made up employing either a neutral petroleum distillate boiling within the kerosene range or acetone as solvent. The solutions were tested for toxicity against the two-spotted spider mite, *Tetranychus telarius*, and the pea aphid, *Macrosiphum pisi*, by spraying groups of plants infested with these insects under controlled conditions which varies from one test to the other only with respect to the test material and its concentration. In each set of tests the conditions were directly comparable, i.e., the same test insect, same species of plant, environment, etc., were used and the concentration of active material in each case was the same. The toxicities are expressed in terms of the $LC_{50}$ dosage—that is, the concentration of

TABLE Ic

Compounds of the subclass having the structure:

$$\begin{array}{c} R_1-O \\ \phantom{R_1-}\diagdown \\ \phantom{R_1-O}P-O-C-CH_2COCH-\!\!\!\!\!\bigcirc\!\!\!\!\!-X \\ \phantom{R_1-}\diagup \\ R_2-O \end{array} \quad \begin{array}{c} O\quad CH_2\quad O \\ \uparrow\ \ \|\ \ \ \ \ \|\ \ \ \ \ \\ \phantom{xxxxxxxxxxxx}CH_3 \end{array}$$

| Compound | $R_1$ | $R_2$ | X | Calcd. P | Calcd. Cl | Calcd. S | Found P | Found Cl | Found S | Method |
|---|---|---|---|---|---|---|---|---|---|---|
| AA | $C_2H_5-$ | $C_2H_5-$ | H— | 9.1 | 0.0 | | 9.0 | 0.6 | | A |
| AB | $CH_3-$ | $CH_3-$ | 4-Cl— | 8.9 | 10.2 | | 8.8 | 10.6 | | A |
| AC | $C_2H_5-$ | $C_2H_5-$ | 4-Cl— | 8.2 | 9.4 | | 8.4 | 9.5 | | A |
| AD | $CH_3-$ | $CH_3-$ | 4-F— | 9.3 | | | 9.5 | | | B |
| AD | $CH_3-$ | $CH_3-$ | 4-F— | | | | 8.8 | | | A |
| AE | $CH_3-$ | $CH_3OC_2H_4-$ | 4-F— | 8.3 | | | 7.7 | | | A |
| AF | $CH_3-$ | $CH_3-$ | $2,4-(CH_3)_2-$ | 9.1 | | | 8.5 | | | B |
| AF | $CH_3-$ | $CH_3-$ | $2,4-(CH_3)_2-$ | | 0.0 | | 8.9 | 0.3 | | A |
| AG | $CH_3-$ | $CH_3-$ | $2,5-(CH_3)_2-$ | 9.1 | | | 9.6 | | | B |
| AG | $CH_3-$ | $CH_3-$ | $2,5-(CH_3)_2-$ | | 0.0 | | 8.3 | 1.6 | | A |
| AH | $C_2H_5-$ | $C_2H_5-$ | $2,5-(CH_3)_2-$ | 8.4 | 0.0 | | 8.1 | 0.5 | | A |
| AI | $C_2H_5-$ | $C_2H_5-$ | $2,4-(CH_3)_2-$ | 8.4 | 0.0 | | 7.9 | 2.3 | | A |
| AJ | $CH_3-$ | $CH_3-$ | $2,4,6-(CH_3)_3-$ | 8.7 | | | 9.4 | | | B |
| AK | $CH_3-$ | $CH_3OC_2H_4-$ | $2,4,6-(CH_3)_3-$ | 7.8 | 0.0 | | 7.8 | 0.45 | | A |
| AL | $CH_3-$ | $CH_3-$ | $4-CH_3O-$ | 9.0 | | | 8.6 | | | B |
| AM | $CH_3-$ | $CH_3-$ | $2-CH_3O-$ | 9.0 | | | 8.5 | | | B |
| AN | $CH_3-$ | $CH_3-$ | $4-C_2H_5O-$ | 8.7 | | | 8.2 | | | B |
| AO | $CH_3-$ | $CH_3-$ | $3,4,5-(CH_3O)_3-$ | 7.7 | | | 7.9 | | | B |
| AP | $CH_3-$ | $CH_3-$ | $4-CH_3S-$ | 8.6 | | 8.9 | 8.2 | | 8.6 | B |
| AP | $CH_3-$ | $CH_3-$ | $4-CH_3S-$ | | | 8.3 | | | 9.6 | A |
| AQ | $C_2H_5-$ | $C_2H_5-$ | $4-CH_3S-$ | 8.0 | | 8.3 | 7.7 | | 8.4 | A |
| AR | $CH_3-$ | $CH_3-$ | $4-C_2H_5S-$ | 8.3 | | 8.6 | 8.7 | | 9.0 | A |
| AS | $CH_3-$ | $CH_3-$ | $4-iC_3H_7S-$ | 8.0 | | 8.2 | 7.9 | | 8.0 | A |
| AT | $CH_3-$ | $CH_3-$ | $4-CH_3SO_2-$ | 7.9 | | 8.2 | 8.4 | | 8.3 | A |
| AU | $CH_3-$ | $CH_3-$ | $4-(CH_3)_2NSO_2-$ | 7.3 | | 7.6 | 6.8 | | 7.3 | A |
| AV | $CH_3-$ | $CH_3OC_2H_4-$ | $4-CH_3S-$ | Infra-red spectrum | | | | | | B |
| AV | $CH_3-$ | $CH_3OC_2H_4-$ | $4-CH_3S-$ | | | | | | | A | the test material required to produce 50% mortality of the test insects.

TABLE II

| Compound | LC₅₀ dosage for test insect | |
|---|---|---|
| | Pea aphid | 2-spotted spider mite |
| B | .0054 | >.2 |
| C | .0029 | .102 |
| G | .00105 | .096 |
| H | .00113 | .061 |
| J | .00225 | >.2 |
| N | .002 | >.2 |
| O | .0025 | >.2 |
| AA | .0066 | >.2 |
| AB | .00182 | >.2 |
| AC | .0038 | >.2 |
| AD | .00068 | .0184 |
| AJ | .0055 | .074 |
| AO | .00099 | .0665 |
| AP | .0008 | .012 |

Some of the compounds of this invention have shown activity as anthelmintics.

EXAMPLE VI

The activity of the compounds of this invention with respect to helminth-parasites of warm-blooded animals, and their relatively low toxicity with respect to the host animals—that is, their high safety factors—was demonstrated by the following tests:

Mammalian toxicity

This is defined as the maximum tolerated dosage, milligrams of test compound per kilogram of animal body weight, and was determined as follows: by intubation a group of mice was treated with a dosage of 500 milligrams of test compound per kilogram of mouse body weight. If any of the mice died, further groups of mice were treated with successively smaller dosages of the test compound, until a dosage was found that all of the mice survived. This is recorded as the maximum tolerated dose:

Anthelmintic activity

This is reported as the minimum effective dosage, milligrams of test compound per kilogram of animal body weight, to effect a certain standard of clearance of parasites from the host animal. It was determined in any given case as follows: A group of 5 mice, parasitized by pinworm (*Syphacia obvelata*), was treated, by intubation with a single dose of the test compound, the dosage being near but less than the maximum tolerated dose. The treated mice were kept from feed and water for 24 hours following treatment, then the mice were sacrificed and the intestinal tract examined for the presence of parasites. If 60% or more of the mice were completely cleared of one and/or the other of the species of parasites, the test was replicated and if the results were confirmed, additional groups of parasitized mice were treated with successively lower dosages of the test compound, to ascertain the minimum dosage required to clear 60% or more of the mice completely of one and/or the other of the two species of parasites.

Safety factor

This is expressed as the ratio of the maximum tolerated dose (M.T.D) to the minimum effective dose (M.E.D.).

Compounds of the invention were evaluated according to this procedure. The results were as follows:

TABLE III

| Compound | Anthelmintic activity | | Safety factors |
|---|---|---|---|
| | M.T.D. | M.E.D. | |
| B | >1,000 | 250 | >4 |
| C | 125 | 31 | 4 |
| F | >125 | 125 | >1 |
| M | >125 | 125 | >1 |
| AA | >1,000 | 500 | >2 |
| AC | >500 | 500 | >1 |
| AD | 250 | 31 | >8 |
| AF | 250 | 16 | >15 |
| AG | 250 | 16 | >15 |
| AH | 500 | 125 | 4 |
| AJ | 250 | 31 | >8 |
| AM | 250 | 8 | >30 |
| AN | >1,000 | 62 | >15 |
| AP | 125 | 16 | 7 |

EXAMPLE VII

The compounds of this invention are suitable precursors for the preparation of known enol phosphate insecticides—including at least two commercial insecticides of this kind—as well as novel enol phosphate insecticides of copending application Ser. No. 724,240 filed Apr. 25, 1968.

Conversion of the iso-enol phosphates of this invention to the corresponding enol phosphates is effected by treating the iso-enol phosphate with a strong base, in the presence of a suitable inert solvent.

Suitable bases include tri(lower alkyl)amines, cyclic nitrogen bases such as pyridine, methyl picolines, methyl piperidines, and alkali metal (lower alkoxides).

At least 0.05 mole and preferably at least 0.10 of base per mole of iso-enol phosphate is used. Generally, use of more than one mole of base per mole of iso-enol phosphate will not be required, and indeed in most cases, more than about 0.5 mole of base per mole of iso-enol phosphate will not be found to be of advantage.

Where an alkoxide is used as the base, the solvent may be the alkanol corresponding to the alkoxide. Methylene chloride, or other haloalkane, is suitable as solvent where a nitrogen base is used.

The conversion suitably is conducted about room temperature or slightly above—say 15–50° C. If desired, the reactants can be mixed at a temperature below this range, then the mixture allowed to rise to room temperature or above, using the higher temperatures to insure completion of the reaction.

A material advantage of this route to enol phosphate is that it results in a high ratio of the cis-crotonate form as opposed to the transcrotonate form. This is highly advantageous because the cis-form is, in by far most of the cases, much more insecticidal than is the trans-form.

Conversion of the iso-enol phosphate to the corresponding enol phosphate is illustrated in the following examples, in which "parts" designates parts by weight unless otherwise expressly indicated, and parts by weight bear the same relationship to parts by volume as does the kilogram to the liter.

EXAMPLE VIII

Dimethyl 2-methoxycarbonyl-1-methylvinyl phosphate [1]

(a) 2.2 parts of dimethyl 1-(methoxycarbonylmethyl) vinyl phosphate ( compound A), 0.048 part of sodium

---

[1] Marketed commercially as an insecticide under the trademark Phosdrin® Insecticide.

methoxide and 10 parts by volume of methanol were mixed and allowed to stand for 1¼ hours. The mixture then was treated with concentrated hydrochloric acid, washed with sodium bicarbonate solution, dried and filtered. The resulting solution was partially stripped of solvent using a rotary evaporator at water aspirator vacum, then was diluted with carbon tetrachloride and stripped to leave 2.4 parts of a liquid identified by nuclear magnetic resonance spectrum analysis as:

86% cis-form of dimethyl 2-(methoxycarbonyl)-1-methylvinyl phosphate;
4% trans-isomer of that compound;
6% unreacted iso-enol;
4% by products.

(b) Similarly, a mixture of 4.4 parts of compound A, 0.4 part triethylamine in 20 parts by volume of methylene chloride, upon standing overnight, gave 4.4 parts of a liquid analyzing 90% cis-form of dimethyl 2-(methoxycarbonyl)-1-methylvinyl phosphate, with a cis:trans isomer ratio of 95:5.

EXAMPLE IX

Dimethyl 1-(alpha-methylbenzyloxycarbonyl)-1-methylvinyl phosphate [2]

5 parts of dimethyl 2-(alpha-methylbenzyloxycarbonylmethyl)vinyl phosphate was dissolved in 5 parts by volume of methanol and mixed with 20 mole percent of a 20 percent by weight solutioin of sodium methoxide in methanol. After standing at room temperature for 1.5 hours, the mixture was treated with 40 mole percent of the sodium methoxide solution and heated at 40° C. for 20 minutes. The mixture then was diluted with ether, washed with water, dried and stripped at 40° C. (0.5 torr) to give 4.02 parts of clear yellow liquid, identified as dimethyl 1-(alpha-methylbenzyloxycarbonyl)-1-methylvinyl phosphate by infra-red spectrum analyses, which also showed that about 90% of the compound was in the cis-crotonate form, less than 3% being in the trans-form.

EXAMPLE X

Preparation of dimethyl 2-(alpha-methyl-4-(methylthio)benzyloxy-carbonyl)-1-methylvinyl phosphate (a) Preparation of 4-chloroacetoacetyl chloride.—55 parts of diketene in 400 parts by volume of methylene chloride was cooled to −40° C. and treated with 46.5 parts of chlorine over a 30 minute period maintaining the temperature of the exothermic reaction at −40° C. The mixture was stirred at room temperature for an additional one and one-half hours to give the crude 4-chloroacetoacetyl chloride in solution.

(b) Preparation of alpha-methyl-4-(methylthio)benzyl 4-chloroacetoacetate.—The solution obtained in (a) above was added to 100 parts of alpha-methyl-4-(methylthio) benzyl alcohol in mixture with 200 parts by volume of methylene chloride and 87 parts of sodium carbonate over a period of one hour at reflux. The mixture was refluxed for an additional one hour, cooled, filtered and washed with 3 N HCl, water, 5% NaHCO₃ and then water. After drying with anhydrous magnesium sulfate, the solution was stripped on a rotary evaporator at water aspirator vacuum to give 151 parts of crude product as a brown oil. Crystallization from ether at low temperature (product liquid at room temperature) gave 107 parts of alpha-methyl-4-(methylthio)-benzyl 4-chloroacetoacetate as a light brown oil which was indentified by elemental and infrared spectrum analyses.

*Elemental analysis.*—Calculated for $SO_3ClC_{13}H_{15}$ (percent by weight): Cl, 12.4; acid elements, 95.5. Found (percent by weight): Cl, 13.8; acid elements, 88.6.

A typical preparation of alpha-methyl-4-(methylthio) benzyl alcohol is performed as follows:

25.6 parts of sodium borohydride, 400 parts by volume of ethanol and 5 drops of 5% aqueous sodium hydroxide were placed in a reactor. To the constantly stirred mixture, 112 parts of 4'-(methylthio)acetophenone in 200 parts by volume of ethanol was slowly added over a period of about one hour. The mixture was cooled to hold its temperature at about 30° C. After addition of the acetophenone was complete, an additional 10 parts of sodium borohydride was added and the mixture stirred for 3 hours. The mixture then was diluted with water and methylene chloride, the two phases were separated and the aqueous phase extracted with methylene chloride. The methylene chloride phases were combined, washed with water, dried, and stripped under house vacuum to give 92.6 parts of yellow oil. The oil was extracted with 250 parts by volume of ether, the extract was cooled with Dry Ice. A yellow solid precipitated, was collected by filtration and washed with cold hexane/ether. A second crop (identical to the first by infrared spectrum analysis) was obtained, to yield 69.0 parts of alpha-methyl-4-(methylthio) benzyl alcohol.

(c) Preparation of dimethyl 1-(alpha-methyl-4-(methylthio)benzyloxy - carbonylmethyl)vinyl phosphate.—303 parts of trimethyl phosphite was added to 637 parts of ester from (b) above at 70° C. The reaction was exothermic and the temperature was maintained at 75–85° by cooling during the addition period of 15 minutes and for 15 minutes thereafter. The mixture was then heated to 90° C. for one hour and then stripped in a rotary evaporator at 75° C. and 0.5 torr pressure to give 785 parts of crude dimethyl 1 - (alpha-methyl-4-(methylthio)benzyloxy-carbonylmethyl)vinyl phosphate which was identified by infrared spectrum analysis.

(d) Preparation of dimethyl 2-(alpha-methyl-4-(methylthio)benzyloxy-carbonyl) - 1 - methylvinyl phosphate.—Triethylamine, 2.38 parts, 84.7 parts of the crude phosphate from (c) above were mixed and heated at 45° C. for 2¾ hours. The mixture then was cooled, dissolved in methylene chloride and washed with water, 5% sodium bicarbonate and then water. The mixture was dried with anhydrous magnesium sulfate and then stripped using a rotary evaporator to 55° C. and 0.4 torr pressure to give 73 parts of crude dimethyl 2-(alpha-methyl-4-(methylthio)-benzyloxycarbonyl)-1-methylvinyl phosphate which was indentified by elemental and infrared and Nuclear Magnetic Resonance spectrum analyses.

*Elemental analysis.*—Calculated for $PSO_6C_{15}H_{21}$ (percent by weight): P, 8.6; Cl, 0.0. Found (percent by weight): P, 7.8; Cl, 1.4.

Chromatography of a similarly prepared sample using silica gel, ether: CCl₄ (1:19) and ether:hexane (4:1) gave essentially pure (A) as shown by infrared and NMR spectral analyses and elemental analysis (percent by weight). Calculated for $PSO_6C_{15}H_{21}$: P, 8.6; S, 8.9. P, 8.6; S, 8.8.

EXAMPLE XI

Following these procedures, the enol phosphates described in Table IV were prepared from the appropriate enol phosphate precursors.

---

[2] Marketed commercially as an insecticide under the trademark Ciodrin® Insecticide.

TABLE IV

Compounds of the formula:

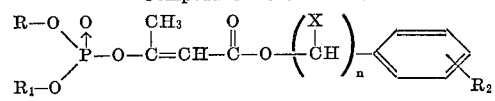

| Precursor | Compound | R | R₁ | X | R₂ | n | Analysis Calcd. P | Calcd. Cl | Calcd. S | Found P | Found Cl | Found S |
|---|---|---|---|---|---|---|---|---|---|---|---|---|
| AQ | BA | C₂H₅— | C₂H₅— | CH₃— | 4-CH₃S— | 1 | 8.0 | | 8.3 | 7.1 | | 10.0 |
| R | BC | CH₃— | CH₃— | C₃H₇— | 4-Cl— | 1 | 8.2 | 9.4 | | 7.6 | 9.0 | |
| S | BD | C₂H₅— | C₂H₅— | C₃H₇— | 4-Cl— | 1 | 7.7 | 8.8 | | 7.9 | 9.1 | |
| U | BE | CH₃— | CH₃OC₂H₄— | C₃H₇— | 4-Cl— | 1 | 7.1 | 8.4 | | 7.5 | 8.3 | |
| T | BF | CH₃— | C₃H₇— | C₃H₇— | 4-Cl— | 1 | 7.7 | 8.8 | | 8.0 | 8.4 | |
| AE | BG | CH₃— | CH₃OC₂H₄— | CH₃— | 4-F— | 1 | 8.3 | | | 8.2 | | |
| AK | BH | CH₃— | CH₃OC₂H₄— | CH₃— | 2,4,6-(CH₃)₃— | 1 | 7.8 | 0.0 | | 8.1 | 0.05 | |
| AG | BI | CH₃— | CH₃— | CH₃— | 2,5(CH₃)₂— | 1 | 9.1 | 0.0 | | 9.0 | 0.6 | |
| AU | BJ | CH₃— | CH₃— | CH₃— | 4-(CH₃)₂NSO₂— | 1 | 7.4 | | 7.6 | 6.1 | | 8.0 |
| | BK | CH₃— | CH₃— | | 4-CH₃—S— | 0 | 9.3 | | 9.6 | 9.1 | | 9.6 |
| K | BL | CH₃— | CH₃— | H— | 4-CH₃S— | 1 | 8.9 | | 9.2 | 7.9 | | 8.6 |

We claim as our invention:

1. Compounds of the class defined by the formula:

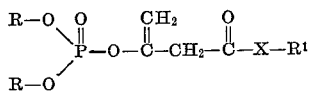

wherein each R is the same or different alkyl of from 1 to 4 carbon atoms, alkyl of from 2 to 8 carbon atoms containing from 1 to 2 oxy oxygen atoms linking carbon atoms; X is oxygen or sulfur and R¹ is:
 (a) alkyl of 1 to 4 carbon atoms
 (b) alkenyl of 2 to 4 carbon atoms
 (c) alkynyl of 3 to 4 carbon atoms
 (d) phenyl or phenalkyl in which the alkyl moiety contains from 1 to 4 carbon atoms, or either of these wherein the phenyl ring is substituted by from 1 to 3 of alkyl of 1 to 4 carbon atoms; halogen; alkoxy of 1 to 3 carbon atoms; alkylthio, alkylsulfinyl or alkylsulfonyl of 1 to 3 carbon atoms; sulfonamido; N-alkylsulfonamido of 1 to 4 carbon atoms, or N,N-dialkylsulfonamido wherein each alkyl contains 1 to 4 carbon atoms.

2. Compounds according to claim 1 wherein both of R are the same and are methyl or ethyl, and X is oxygen.

3. A compound according to claim 2 wherein each of R is methyl and R' is alpha-methyl-4-(methylthio)benzyl.

4. A compound according to claim 2 wherein each of R is methyl and R' is alpha-methyl-4-(methylsulfonyl)benzyl.

5. A compound according to claim 2 wherein each of R is methyl and R' is alpha-methyl-4-chlorobenzyl.

6. A compound according to claim 2 wherein each of R is methyl and R' is 4-(methylthio)benzyl.

7. A compound according to claim 2 wherein one of R is methyl the other is 2-(methoxy)ethyl and R' is alpha-methyl-4-(methio)benzyl.

References Cited

UNITED STATES PATENTS 631,756  8/1899  Ach _____ 260—989X

OTHER REFERENCES

Cram et al.: "Organic Chemistry," McGraw-Hill Book Co., New York (1964), pp. 501 and 503.

CHARLES B. PARKER, Primary Examiner

A. H. SUTTO, Assistant Examiner

U.S. Cl. X.R.

260—455, 483, 544, 989; 424—212, 301